US009984627B2

(12) United States Patent
Fujimura et al.

(10) Patent No.: US 9,984,627 B2
(45) Date of Patent: May 29, 2018

(54) DISPLAY PANEL AND DISPLAY UNIT

(71) Applicant: JOLED Inc., Tokyo (JP)

(72) Inventors: Hiroshi Fujimura, Tokyo (JP); Tetsuro Yamamoto, Tokyo (JP)

(73) Assignee: JOLED Inc., Tokyo (JP)

( * ) Notice: Subject to any disclaimer, the term of this patent is extended or adjusted under 35 U.S.C. 154(b) by 0 days. days.

(21) Appl. No.: 15/268,839

(22) Filed: Sep. 19, 2016

(65) Prior Publication Data

US 2017/0092197 A1 Mar. 30, 2017

(30) Foreign Application Priority Data

Sep. 25, 2015 (JP) ................................ 2015-188062

(51) Int. Cl.
*G06F 1/00* (2006.01)
*G09G 3/3258* (2016.01)
*G09G 3/3266* (2016.01)

(52) U.S. Cl.
CPC ......... *G09G 3/3258* (2013.01); *G09G 3/3266* (2013.01); *G09G 2300/0452* (2013.01); *G09G 2300/0842* (2013.01); *G09G 2320/0233* (2013.01); *G09G 2320/0247* (2013.01)

(58) Field of Classification Search
CPC . H04N 5/378; H04N 1/00; H04N 3/00; G11C 11/419; G06F 11/1464
See application file for complete search history.

(56) References Cited

U.S. PATENT DOCUMENTS

2010/0053131 A1* 3/2010 Handa .................. G09G 3/3233 345/206
2010/0118013 A1* 5/2010 Kitayama ............ G09G 3/3614 345/211
2012/0139959 A1* 6/2012 Kim ..................... G09G 3/3233 345/690
2012/0242642 A1* 9/2012 Yamazaki ............. G09G 3/344 345/212
2016/0150171 A1* 5/2016 Raynor .................. H04N 5/345 348/302

FOREIGN PATENT DOCUMENTS

JP 2009-145531 A 7/2009

* cited by examiner

*Primary Examiner* — Michael Faragalla
(74) *Attorney, Agent, or Firm* — Michael Best & Friedrich LLP

(57) ABSTRACT

A display panel includes a plurality of pixels, and a plurality of signal lines and a plurality of power lines. The plurality of pixels are disposed in matrix. The plurality of signal lines and the plurality of power lines both extend in a column direction. The plurality of power lines include a plurality of first power lines assigned to respective odd-numbered pixel rows and a plurality of second power lines assigned to respective even-numbered pixel rows. The first power lines are electrically coupled to one another. The second power lines are electrically coupled to one another.

12 Claims, 16 Drawing Sheets

DISPLAY PANEL AND DISPLAY UNIT

CROSS REFERENCE TO RELATED APPLICATIONS

The present application claims priority from Japanese Patent Application No. 2015-188062 filed on Sep. 25, 2015, the entire contents of which are hereby incorporated by reference.

BACKGROUND

The technology relates to a display panel and a display unit.

In the technical field of display units that display an image, recently, a display unit utilizing, as a light-emitting device of a pixel, a current-driven optical device such as an organic electroluminescence (EL) device has been developed, and increasingly commercialized. The current-driven optical device has emission luminance which varies depending on a value of a flowing current. The organic EL device is a self-light-emitting device unlike a device such as a liquid crystal device. The display unit utilizing the organic EL device (organic EL display unit) therefore does not need a light source (backlight), thus enabling the organic EL display unit to be more lightweight and thinner, and to have higher luminance than a liquid crystal display unit that needs a light source. Further, the organic EL device has a very high response speed of about several micro seconds, thus preventing the occurrence of an afterimage during display of a motion picture. Hence, the organic EL display unit is expected to be a mainstream next-generation flat panel display.

An active-matrix organic EL display unit has a configuration in which each scanning line is sequentially scanned for one horizontal period (1 H), and a signal voltage corresponding to an image signal is sampled and is written into a holding capacitor. That is, the line sequential scanning in a 1 H cycle allows for the writing operation of the signal voltage. When a threshold voltage and mobility of a driving transistor differ for each pixel, the organic EL device may undesirably have irregular emission luminance in the organic EL display unit, resulting in impaired uniformity of a screen. Thus, the active-matrix organic EL display unit performs a correction operation that reduces the irregular emission luminance caused by the irregular threshold voltage and the irregular mobility of the driving transistor, in addition to the linear sequential scanning in the 1 H cycle. For example, reference is made to Japanese Unexamined Patent Application Publication No. 2009-145531.

SUMMARY

In the active-matrix organic EL display unit, a large amount of current is flowed to a power line to supply power from the power line to each pixel. However, a pulse power that controls the emission and the extinction of the organic EL device is typically applied to the power line. This may undesirably make the size of a power scanner very large, also causing a bezel of the display panel that stores the power scanner to be large. Therefore, it may be considered to standardize a power voltage in every pixel and to remove the power scanner, for example.

However, in the case where the power voltage is standardized in every pixel and the power scanner is removed, the emission period may be only about a half the length of 1F period, causing flickering in emission to occur in some cases.

It is desirable to provide a display panel with a narrow bezel in which flickering in emission is suppressed, and a display unit including the display panel.

A display panel according to an embodiment of the technology includes a plurality of pixels disposed in matrix, and a plurality of signal lines and a plurality of power lines both extending in a column direction. The plurality of power lines include a plurality of first power lines assigned to respective odd-numbered pixel rows and a plurality of second power lines assigned to respective even-numbered pixel rows. The first power lines are electrically coupled to one another, and the second power lines are electrically coupled to one another.

A display unit according to an embodiment of the technology includes a display panel, and a drive circuit that drives the display panel. The display panel includes a plurality of pixels disposed in matrix, and a plurality of signal lines and a plurality of power lines both extending in a column direction. The plurality of power lines include a plurality of first power lines assigned to respective odd-numbered pixel rows and a plurality of second power lines assigned to respective even-numbered pixel rows. The first power lines are electrically coupled to one another, and the second power lines are electrically coupled to one another.

BRIEF DESCRIPTION OF THE DRAWINGS

The accompanying drawings are included to provide a further understanding of the disclosure, and are incorporated in and constitute a part of this specification. The drawings illustrate example embodiments and, together with the specification, serve to explain the principles of the technology.

DETAILED DESCRIPTION

Some example embodiments of the technology are described below in detail, in the following order, with reference to the accompanying drawings.

1. Example Embodiment (display unit)
2. Modification Example (display unit)
3. Application Example (electronic apparatus)

1. Example Embodiment

[Configuration]

Figure 1:
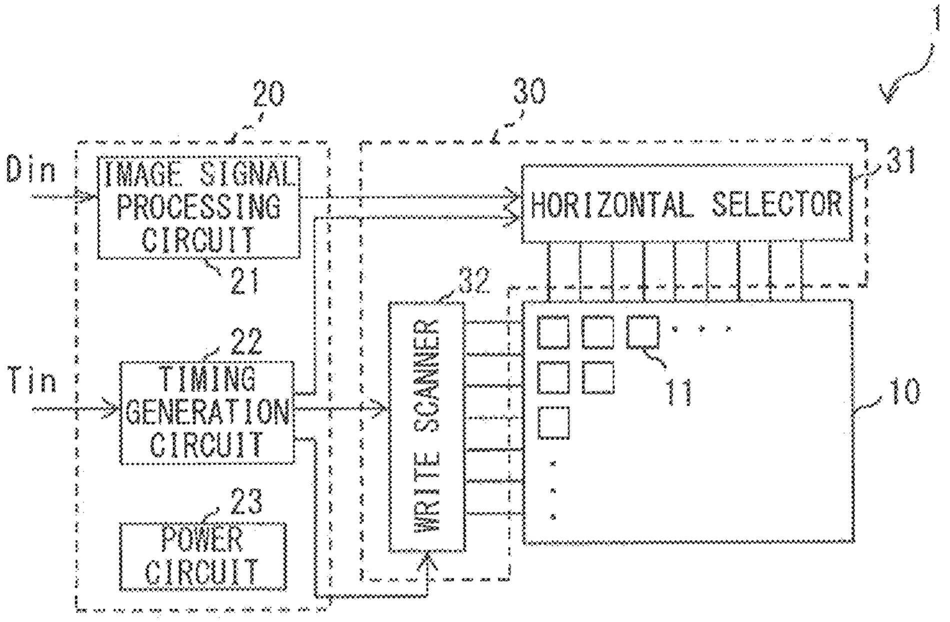
FIG. 1 is a schematic configuration diagram of a display unit according to an example embodiment of the technology.

FIG. 1 illustrates a schematic configuration of a display unit 1 according to an example embodiment of the technology. The display unit 1 may include a display panel 10, a controller 20, and a driver 30, for example. The driver 30 may be mounted on an outer edge part of the display panel 10. The display panel 10 corresponds to a specific but non-limiting example of the "display panel" according to an embodiment of the technology. The controller 20 and the driver 30 correspond to a specific but non-limiting example of the "drive circuit" according to an embodiment of the technology. The display panel 10 includes a plurality of pixels 11 disposed in matrix. The pixel 11 corresponds to a specific but non-limiting example of the "pixel" according to an embodiment of the technology. The controller 20 and the driver 30 may drive the display panel 10 on the basis of an image signal Din and a synchronizing signal Tin which are supplied from the outside.

(Display Panel 10)

Figure 2:
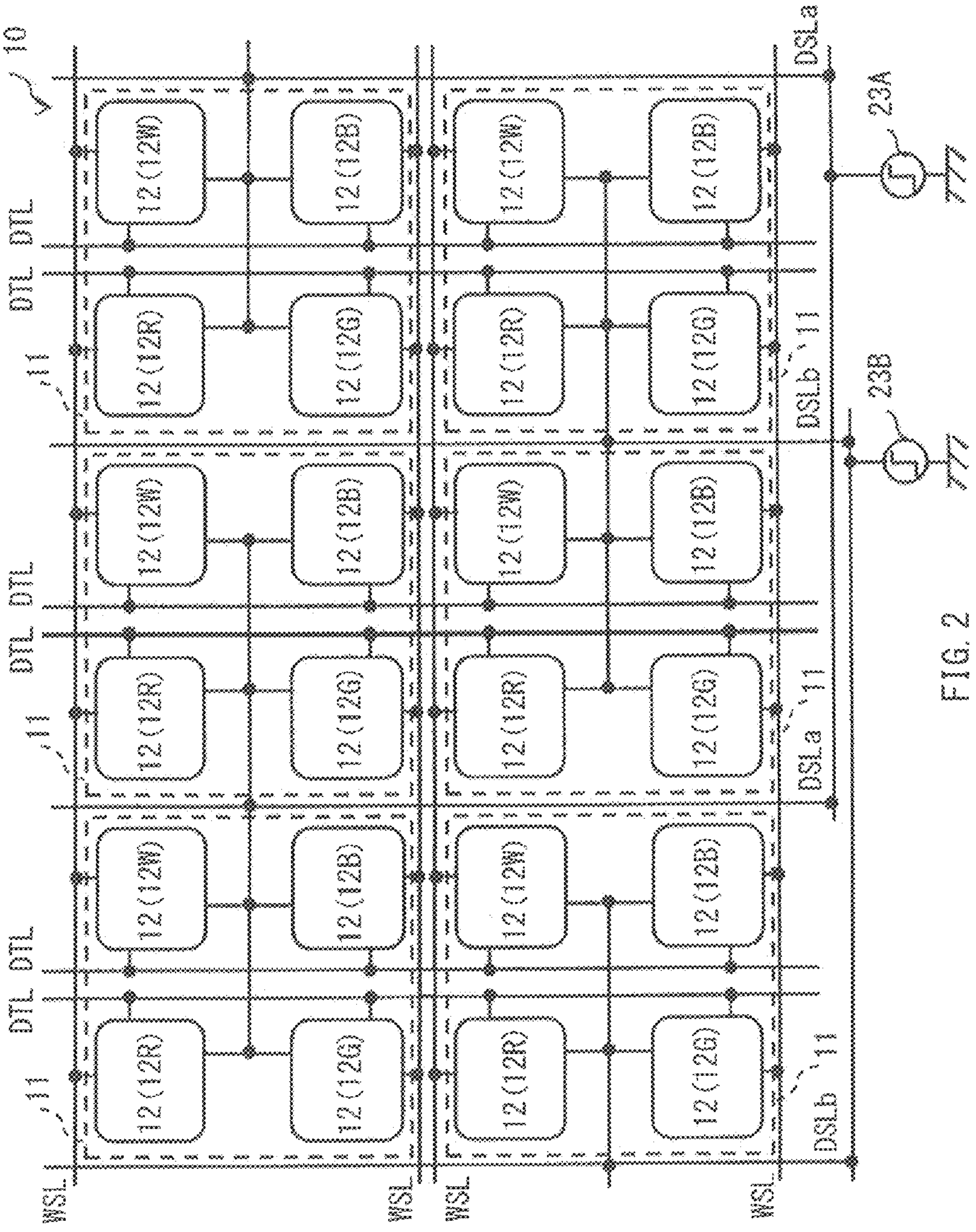
FIG. 2 is a diagram illustrating an example of a circuit configuration of a display panel.

FIG. 2 illustrates an example of a circuit configuration of the display panel 10. The controller 20 and the driver 30 may active-matrix-drive each of the pixels 11 to allow the display panel 10 to display an image based on the image signal Din and the synchronizing signal Tin which are supplied from the outside. The display panel 10 includes a plurality of scanning lines WSL extending in a row direction, a plurality of signal lines DTL and a plurality of power lines DSL both extending in a column direction, and the plurality of pixels 11 disposed in matrix. The signal line DTL corresponds to a specific but non-limiting example of the "signal line" according to an embodiment of the technology. The signal line DSL corresponds to a specific but non-limiting example of the "power line" according to an embodiment of the technology.

The scanning line WSL may be used for selecting each of the pixels 11, and may supply a selection pulse to each of the pixels 11. The selection pulse may select each of the pixels 11 for each predetermined unit (e.g., for each pixel row). The signal line DTL may be used for supplying to each of the pixels 11 a signal voltage Vsig in accordance with the image signal Din, and may supply to each of the pixels 11 a data pulse including the signal voltage Vsig. The power line DSL may supply power to each of the pixels 11.

Each of the pixels 11 may include a plurality of subpixels 12. More specifically, as illustrated in FIG. 2, each of the pixels 11 may be configured by four subpixels 12. The four subpixels 12 may be disposed in 2 by 2 matrix form. The four subpixels 12 may be configured by subpixels 12R, 12G, 12B, and 12W, for example. The subpixel 12R may be a pixel that emits red light. The subpixel 12G may be a pixel that emits green light. The subpixel 12B may be a pixel that emits blue light. The subpixel 12W may be a pixel that emits white light. It is to be noted that a display panel 10 is described herein on the assumption that the four subpixels 12 included in each of the pixels 11 are configured, respectively, by subpixels 12R, 12G 12B, and 12W. However, the four subpixels 12 included in each of the pixels 11 herein may be configured by elements different from the foregoing elements. The four subpixels 12 included in each of the pixels 11 may be configured by one subpixel 12R, two subpixels 12G, and one subpixel 12B, or alternatively may be configured by one subpixel 12R, one subpixel 12G, and two subpixels 12B, for example.

Two scanning lines WSL may be assigned to each pixel row. More specifically, one scanning line WSL may be assigned to each subpixel row included in the pixel row. In each pixel row, each of the pixels 11 may be interposed between two scanning lines WSL. In each pixel row, two signal lines DTL may be assigned to each of the pixels 11. More specifically, one signal line DTL may be assigned to each subpixel column included in the pixel row. In each of the pixels 11, two signal lines DTL may be interposed between two subpixel columns.

A plurality of predetermined power lines DSLa of the plurality of power lines DSL may be assigned to respective odd-numbered pixel rows (first pixel row, third pixel row, . . . from the top). The power lines DSLa may be coupled to one another and may have the same potential. The power line DSLa corresponds to a specific but non-limiting example of the "first power line" according to an embodiment of the technology. A plurality of predetermined power lines DSLb of the plurality of power lines DSL may be assigned to respective even-numbered pixel rows (second pixel row, fourth pixel row, . . . from the top). The power lines DSLb may be coupled to one another and may have the same potential. The power line DSLb corresponds to a specific but non-limiting example of the "second power line" according to an embodiment of the technology. The power lines DSLa and the power lines DSLb may be electrically separated from each other, and may be driven independently of each other. The plurality of power lines DSLa may be even-numbered power lines DSL (second power line DSL, fourth power line DSL, . . . from the top), for example. Further, the plurality of power lines DSLb may be odd-numbered power lines DSL (first power line DSL, third power line DSL, . . . from the top), for example. It is to be noted that the plurality of power lines DSLa may be odd-numbered power lines DSL. In this case, the plurality of power lines DSLb may be even-numbered power lines DSL.

One power line DSLa may be assigned to each unit of two pixels 11 adjacent to each other in each of the odd-numbered pixel rows. Further, one power line DSLb may be assigned to each unit of two pixels 11 adjacent to each other in each of the even-numbered pixel rows. Two pixels 11 assigned to each power line DSLa and two pixels 11 assigned to each power line DSLb may be disposed so as to be staggered by one pixel 11. Each power line DSLa may be disposed between the two pixels 11 assigned to the each power line DSLa. Each power line DSLb may be disposed between the two pixels 11 assigned to the each power line DSLb.

Each signal line DTL may be coupled to an output terminal of a horizontal selector 31 to be described later. Each scanning line WSL may be coupled to an output terminal of a write scanner 32 to be described later. Each power line DSLa may be coupled to an output terminal of a first power supply 23A to be described later. Each power line DSLb may be coupled to an output terminal of a second power supply 23B to be described later.

Figure 3:
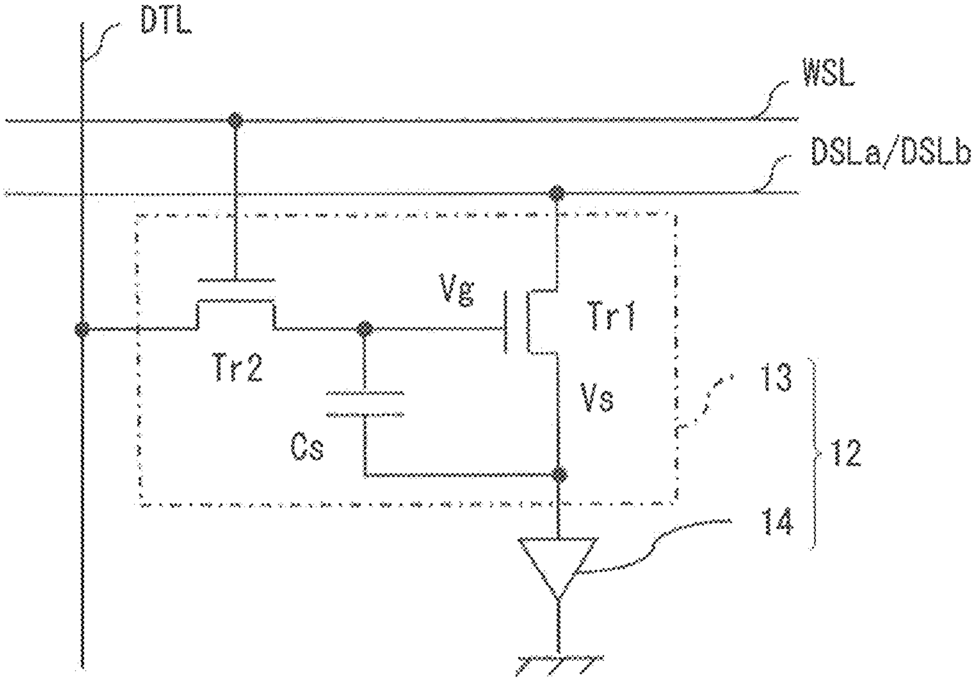
FIG. 3 is a diagram illustrating an example of a circuit configuration of each of subpixels.

FIG. 3 illustrates an example of a circuit configuration of each of the subpixels 12. Each of the subpixels 12 may include a pixel circuit 13 and an organic EL device 14, for example. The organic EL device 14 may have a configuration in which an anode electrode, an organic layer, and a cathode electrode are layered sequentially, for example. The organic EL device 14 may have a device capacitance. The pixel circuit 13 may control the emission and the extinction of the organic EL device 14. The pixel circuit 13 may have a function of holding a voltage written into each of the pixels 11 by means of write scanning to be described later. The pixel circuit 13 may include a drive transistor Tr1, a write transistor Tr2, and a holding capacitor Cs, for example.

The write transistor Tr2 may control application of the signal voltage Vsig corresponding to the image signal Din to a gate of the drive transistor Tr1. More specifically, the write transistor Tr2 may sample a voltage of the signal line DTL, and write the voltage obtained by the sampling into the gate of the drive transistor Tr1. The drive transistor Tr1 may be coupled in series to the organic EL device 14. The drive transistor Tr1 may drive the organic EL device 14. The drive transistor Tr1 may control a current flowing into the organic EL device 14 depending on the magnitude of the voltage sampled by the write transistor Tr2. The holding capacitor Cs may hold a predetermined voltage between the gate and a source of the drive transistor Tr1. The holding capacitor Cs may have a role of holding a gate-source voltage Vgs of the drive transistor Tr1 to be constant during a standby period to be described later. It is to be noted that the pixel circuit 13 may have a circuit configuration in which various capacitors or transistors are added to the foregoing circuit including two transistors (Tr) and one capacitor (C), or may have a circuit configuration different from that of the foregoing circuit including two transistors (Tr) and one capacitor (C).

The drive transistor Tr1 and the write transistor Tr2 may be each formed of n-channel MOS thin film transistor (TFT), for example. It is to be noted that these transistors may be each formed of p-channel MOS TFT. The following description is given on the assumption that these transistors are of enhancement type. However, these transistors may be of depression type.

Each signal line DTL may be coupled to the output terminal of the horizontal selector 31 to be described later and to a source or a drain of the write transistor Tr2. Each scanning line WSL may be coupled to the output terminal of the write scanner 32 to be described later and to a gate of the write transistor Tr2. Each power line DSLa may be coupled to the output terminal of the first power supply 23A and to a source or a drain of the write transistor Tr1. Each power line DSLb may be coupled to the output terminal of the second power supply 23B and to the source or the drain of the write transistor Tr1.

The gate of the write transistor Tr2 may be coupled to the scanning line WSL. The source or the drain of the write transistor Tr2 may be coupled to the signal line DTL. A terminal, which is not coupled to the signal line DTL, of the source and the drain of the write transistor Tr2 may be coupled to the gate of the drive transistor Tr1. The source or the drain of the drive transistor Tr1 may be coupled to the power line DSLa or the power line DSLb. A terminal, which is not coupled to the power line DSLa or the power line DSLb, of the source and the drain of the drive transistor Tr1 may be coupled to an anode of the organic EL device 14. A first end of the holding capacitor Cs may be coupled to the gate of the drive transistor Tr1. A second end of the holding capacitor Cs may be coupled to a terminal on the side of the organic EL device 14, of the source and the drain of the drive transistor Tr1.

Figure 4:
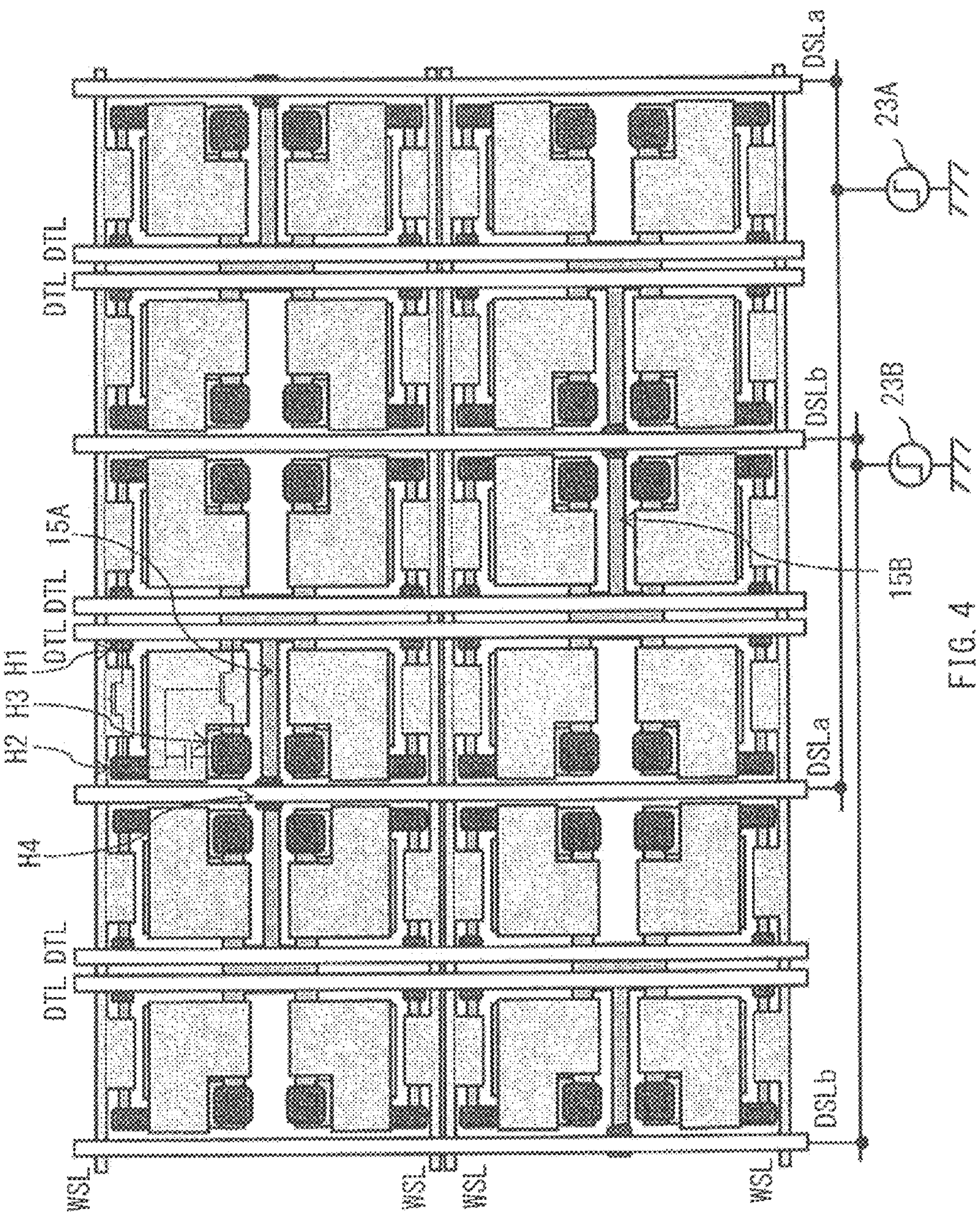
FIG. 4 is a diagram illustrating an example of a wiring layout of a display panel.
Figure 5:
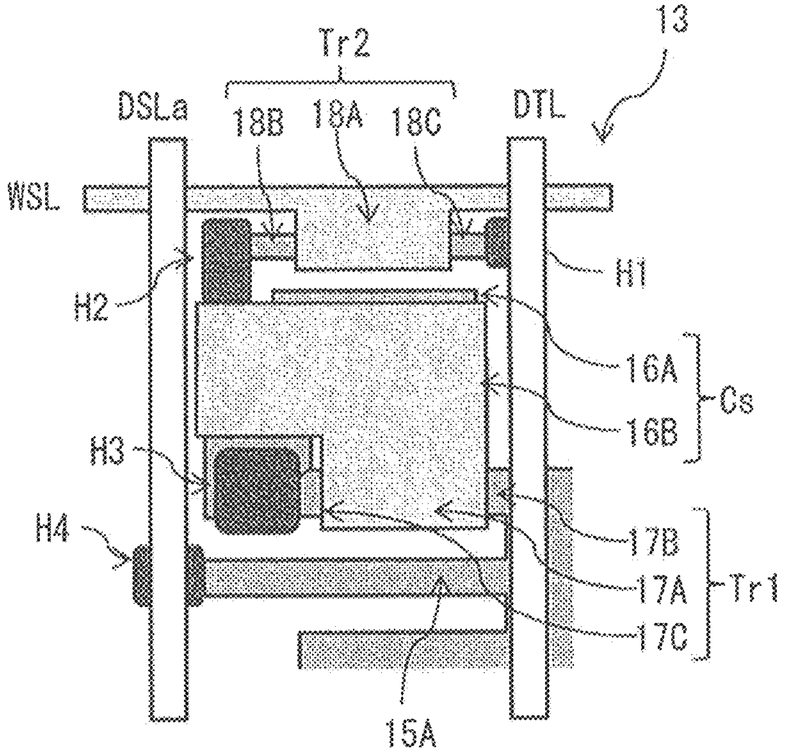
FIG. 5 is a diagram illustrating an example of a wiring layout of each of pixel circuits.

FIG. 4 illustrates an example of a wiring layout of the display panel 10. FIG. 5 illustrates an example of a wiring layout of the pixel circuit 13. Each power line DSLa and each power line DSLb may be disposed in the same layer as that of each signal line DTL. Each power line DSLa may be electrically coupled to each of the subpixels 12 included in two pixels 11 assigned to each of the odd-numbered pixel rows via an electrically conductive semiconductor layer 15A. Each power line DSLb may be electrically coupled to each of the subpixels 12 included in two pixels 11 assigned to each of the even-numbered pixel rows via an electrically conductive semiconductor layer 15B. The semiconductor layers 15A and 15B may be provided in the same layer as that of a source-drain region 17B of the drive transistor Tr1. The semiconductor layers 15A and 15B may be configured by a semiconductor layer common to that of the source-drain region 17B of the drive transistor Tr1, for example. The semiconductor layer 15A may be coupled to the power line DSLa via a contact hole H4. The semiconductor layer 15B may be coupled to the power line DSLb via the contact hole H4.

A gate 17A of the drive transistor Tr1 may also serve as a first electrode 16B of the holding capacitor Cs. A source-drain region 17C of the drive transistor Tr1 may also serve as a second electrode 16A of the holding capacitor Cs. The source-drain region 17C of the drive transistor Tr1 may be coupled to the organic EL device 14 via a contact hole H3. The first electrode 16B of the holding capacitor Cs may be coupled to a source-drain region 18B of the write transistor Tr2 via a contact hole H2. A source-drain region 18C of the write transistor Tr2 may be coupled to the signal line DTL via a contact hole H1. A gate 18A of the write transistor Tr2 may be coupled to the scanning line WSL.

The driver 30 may include the horizontal selector 31 and the write scanner 32, for example. The write scanner 32 corresponds to a specific but non-limiting example of the "drive circuit" according to an embodiment of the technology.

The horizontal selector 31 may apply to each signal line DTL an analog signal voltage Vsig supplied from an image signal processing circuit 21 in response to (in synchronization with) the supply of a control signal, for example. The horizontal selector 31 may be able to supply three types of voltages (Vofs1, Vofs2, and Vsig), for example. More specifically, the horizontal selector 31 may supply the three types of voltages (Vofs1, Vofs2, and Vsig) to a pixel 11 selected by the write scanner 32 via the signal line DTL. The signal voltage Vsig has a voltage value corresponding to an image signal Din. Each of fixed voltages Vofs1 and Vofs2 may be a constant voltage irrelevant to the image signal Din. The minimum voltage of the signal voltage Vsig has a voltage value which is lower than the fixed voltage Vofs1 and higher than the fixed voltage Vofs2. The maximum voltage of the signal voltage Vsig has a voltage value which is higher than both the fixed voltages Vofs1 and Vofs2. The horizontal selector 31 may supply a data pulse including the signal voltage Vsig to each signal line DTL for each horizontal period. The horizontal selector 31 may supply to each signal line DTL a pulse made of three values of the signal voltage Vsig and the fixed voltages Vofs1 and Vofs2 as a data pulse.

The write scanner 32 may scan the plurality of pixels 11 for each predetermined unit. More specifically, the write scanner 32 may sequentially supply a selection pulse to each scanning line WSL in one frame period. The write scanner 32 may select a plurality of scanning lines WSL through a predetermined sequence in response to (in synchronization with) the supply of the control signal, for example, to thereby execute operations such as preparation for threshold correction, threshold correction, writing of the signal voltage Vsig, mobility correction, and emission in a desired order. As used herein, the term "preparation for threshold correction" refers to initializing a gate voltage Vg of the drive transistor Tr1 (more specifically, refers to changing the gate voltage Vg to Vofs2). The term "threshold correction" refers to a correction operation in which the gate-source voltage Vgs of the drive transistor Tr1 is made closer to a threshold voltage Vth of the drive transistor Tr1. The term "writing of the signal voltage Vsig (signal writing)" refers to a writing operation in which the signal voltage Vsig is written into the gate of the drive transistor Tr1 via the write transistor Tr2. The term "mobility correction" refers to an operation in which a voltage held between the gate and the source of the drive transistor Tr1 (gate-source voltage Vgs) is corrected depending on the magnitude of mobility of the drive transistor Tr1. The signal writing and the mobility correction may be performed at different timings in some cases. According to an example embodiment of the disclosure, the write scanner 32 may be designed to supply one selection pulse to the scanning line WSL to thereby perform the signal writing and the mobility correction together (or continuously without interval). It is to be noted that, hereinafter, the term "gate voltage Vg" refers to the gate voltage Vg of the drive transistor Tr1, unless otherwise stated specifically. The term "gate-source voltage Vgs" refers to the gate-source voltage Vgs of the drive transistor Tr1, unless specific explanation is made. The term "threshold voltage Vth" refers to the threshold voltage Vth of the drive transistor Tr1, unless specific explanation is made.

The write scanner 32 may be able to supply two types of voltages (Von and Voff), for example. More specifically, the write scanner 32 may supply a pixel 11 to be driven with the two types of voltages (Von and Voff) via the scanning line WSL to perform ON/OFF control of the write transistor Tr2. The ON-voltage Von is a value equal to or higher than an ON-voltage of the write transistor Tr2. The ON-voltage Von is a peak value of the selection pulse supplied from the write scanner 32 during periods such as "threshold correction preparation period," "threshold correction period," and "signal writing and mobility correction period." The OFF-voltage Voff has a value lower than both the values of the ON-voltage of the write transistor Tr2 and of the ON-voltage Von.

(Controller 20)

Next, the controller 20 is described. The controller 20 may include the image signal processing circuit 21, a timing generation circuit 22, and power circuit 23, for example. The image signal processing circuit 21 may perform a predetermined correction to a digital image signal Din supplied from the outside, for example, and may generate the signal voltage Vsig on the basis of the image signal obtained by the predetermined correction. The image signal processing circuit 21 may supply the generated signal voltage Vsig to the horizontal selector 31, for example. Examples of the predetermined correction may include gamma correction, and overdrive correction. The timing generation circuit 22 may control circuits in the driver 30 to operate in conjunction with one another. The timing generation circuit 22 may supply a control signal to each of the circuits in the driver 30 in response to (in synchronization with) a synchronizing signal Tin supplied from the outside, for example.

The power circuit 23 may generate and supply various fixed voltages necessary for various circuits such as the horizontal selector 31, the write scanner 32, the image signal processing circuit 21, and the timing generation circuit 22. The power circuit 23 may generate voltages Vss, Vcc1, and Vcc2, for example, and may supply these voltages to the foregoing various circuits. Fixed voltages Vss and Vcc2 each have a voltage value lower than a voltage (Vel+Vcath) which is the sum of a threshold voltage Vel of the organic EL device 14 and a cathode voltage Vcath of the organic EL device 14. The fixed voltage Vcc2 is a voltage higher than the fixed voltage Vss. The fixed voltage Vcc1 is a voltage higher than the voltage (Vel+Vcath).

As illustrated in FIGS. 2 and 4, the power circuit 23 may include the first power supply 23A and the second power supply 23B. The power supply 23A may apply a predetermined voltage to each power line DSLa in response to (in synchronization with) the supply of the control signal. The second power supply 23B may apply a predetermined voltage to each power line DSLb in response to (in synchronization with) the supply of the control signal. The first power supply 23A and the second power supply 23B may be able to supply the three types of voltages (Vcc1, Vcc2, and Vss), for example. The first power supply 23A may supply the three types of voltages (Vcc1, Vcc2, and Vss) to each of the pixels 11 included in each of the odd-numbered pixel rows via each power line DSLa, for example. The second power supply 23B may supply the three types of voltages (Vcc1, Vcc2, and Vss) to each of the pixels 11 included in each of the even-numbered pixel rows via each power line DSLb, for example.

[Operation]

Next, operations (from extinction operation to emission operation) of the display unit 1 are described. An example embodiment of the disclosure may incorporate a compensation operation for the variation in I-V characteristics of the organic EL device 14, in order to keep the emission luminance of the organic EL device 14 constant without being affected by possible temporal change in the I-V characteristics of the organic EL device 14. Further, an example embodiment of the disclosure may incorporate a compensation operation for the variation in a threshold voltage and mobility of the drive transistor Tr1, in order to keep the emission luminance of the organic EL device 14 constant without being affected by possible temporal change in the threshold voltage and the mobility of the drive transistor Tr1.

Figure 6:
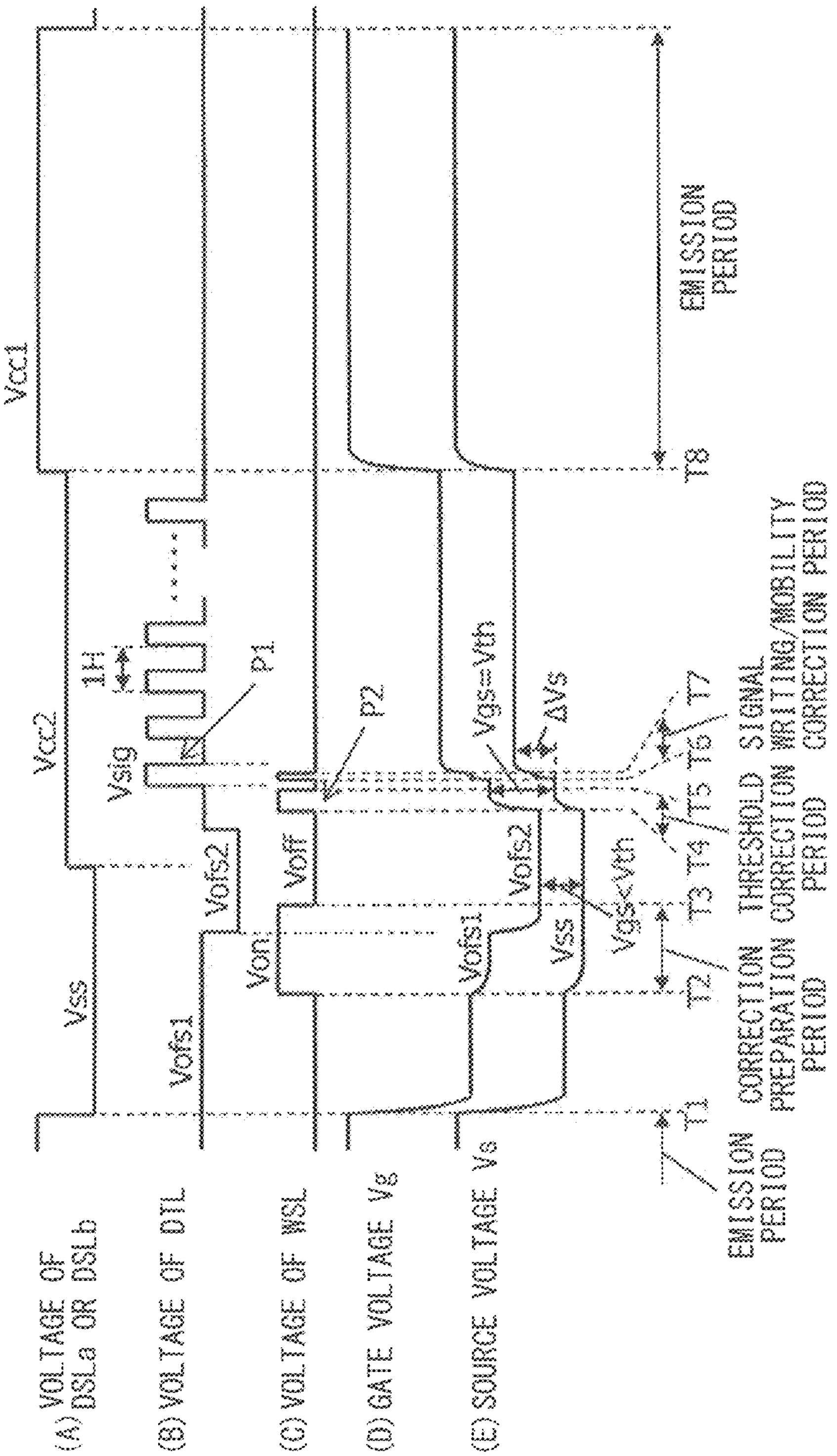
FIG. 6 is a diagram illustrating an example of signal waveforms between extinction and emission.

FIG. 6 illustrates an example of temporal changes in voltages to be applied to the signal line DTL, the scanning line WSL and the power line DSLa or DSLb, and temporal changes in the gate voltage Vg and a source voltage Vs of the drive transistor Tr1, when focusing on one pixel 11. It is to be noted that, as used herein, the term "source voltage Vs" refers to the source voltage Vs of the drive transistor Tr1, unless specific explanation is made.

First, the controller 20 and the driver 30 may extinct the pixel 11. More specifically, when the voltage of the scanning line WSL is Voff; the voltage of the signal line DTL is Vofs1; and the voltage of the power line DSLa or DSLb is Vcc (i.e., when the organic EL device 14 emits light), the power circuit 23 may lower the voltage of the power line DSLa or DSLb from Vcc to Vss depending on the control signal (at time T1). This may decrease the source voltage Vs closer to Vss, allowing the organic EL device 14 to be extinguished. At this time, the gate voltage Vg may also decrease due to coupling via the holding capacitor Cs.

(Correction Preparation Period)

Next, the controller 20 and the driver 30 may prepare threshold correction. More specifically, during the times when the voltage of the power line DSLa or DSLb is Vss; and the voltage of the signal line DTL is Vofs1, the write scanner 32 may increase the voltage of the scanning line WSL from Voff to Von depending on the control signal (at time T2). Then, the gate voltage Vg may change to Vofs1, and the source voltage Vs may change to Vss. At this time, the gate-source voltage Vgs may be higher than the threshold voltage Vth, thus allowing the drive transistor Tr1 to be ON. Thereafter, the horizontal selector 31 may switch the voltage of the signal line DTL from Vofs1 to Vosf2 depending on the control signal. This may decrease the gate voltage Vg from Vofs1 to Vofs2. At this time, the source voltage Vs may remain at Vss, and thus the gate-source voltage Vgs may be a voltage value of (Vofs2−Vss), meaning that the gate-source voltage Vgs may be lower than the threshold voltage Vth. As a result, the drive transistor Tr1 may be turned OFF. Thereafter, the write scanner 32 may decrease the voltage of the scanning line WSL from Von to Voff depending on the control signal (at time T3).

(Threshold Correction Period)

Next, the controller 20 and the driver 30 may perform threshold correction of the drive transistor Tr1. More specifically, during the times when the voltage of the signal line DTL is Vofs2; and the voltage of the scanning line WSL is Voff, the power circuit 23 may increase the voltage of the power line DSL from Vss to Vcc2 depending on the control signal. Subsequently, the horizontal selector 31 may switch the voltage of the signal line DTL from Vofs2 to Vosf1 depending on the control signal, and then may apply the signal voltage Vsig corresponding to each of the pixel rows sequentially to the signal line DTL. At this time, the write scanner 32 may apply to the scanning line WSL a pulse P2 that may increase the voltage of the scanning line WSL from Voff to Von (at time T4) before the supply of a pulse P1 of the signal voltage Vsig corresponding to the first pixel row. Then, the gate voltage Vg may increase to Vofs1, turning the drive transistor Tr1 ON, which may allow a current to flow between the drain and the source of the drive transistor Tr1, thus increasing the source voltage Vs. As a result, the holding capacitor Cs may be charged to have Vth, allowing the gate-source voltage Vgs to be Vth. When the source voltage Vs does not reach the value of (Vofs1−Vth) (i.e., when the threshold correction is not yet completed), during the time when the drive transistor Tr1 remains ON, the write scanner 32 may repeatedly apply the pulse P2 to the scanning line WSL before the supply of the pulse P1 until the drive transistor Tr1 is cut off (i.e., until the gate-source voltage Vgs is Vth).

Thereafter, the write scanner 32 may decrease the voltage of the scanning line WSL from Von to Voff depending on the control signal (at time T5) before the horizontal selector 31 switches the voltage of the signal line DTL from Vofs to Vsig. Then, the gate of the of the drive transistor Tr1 may be brought into a floating state, thus making it possible to keep the gate-source voltage Vgs at Vth irrespective of the magnitude of the voltage of the signal line DTL. Thus, setting the gate-source voltage Vgs at Vth makes it possible to eliminate the dispersion of the emission luminance of the organic EL device 14 even when the threshold voltage Vth of the drive transistor Tr1 varies for each pixel circuit 13.

(Signal Writing and Mobility Correction Period)

After completion of the threshold correction, the controller 20 and the driver 30 may perform mobility correction and writing of the signal voltage Vsig in response to the image signal Din. More specifically, during the times when the voltage of the signal line DTL is Vsig; and the voltage of the power line DSLa or DSLb is Vcc2, the write scanner 32 may increase the voltage of the scanning line WSL from Voff to Von depending on the control signal (at time T6), and may couple the gate of the drive transistor Tr1 to the signal line DTL. Then, the gate voltage Vg may be the voltage Vsig of the signal line DTL. At this time, an anode voltage of the organic EL device 14 may be still lower than the threshold voltage Vel of the organic EL device 14 at this stage, causing the organic EL device 14 to be cut off. Accordingly, a current between the gate and the source may flow to a device capacitance Coled of the organic EL device 14, allowing the device capacitance Coled to be charged. Consequently, the source voltage Vs may increase by ΔVs, soon allowing the gate-source voltage Vgs to be a voltage value of (Vsig+Vth−ΔVs). Thus, mobility correction may be performed together with the writing. As the mobility of the drive transistor Tr1 becomes greater, ΔVs also becomes greater; therefore, making the gate-source voltage Vgs smaller by ΔVs before emission makes it possible to eliminate the dispersion of the mobility for each of the pixels 11.

Thereafter, the write scanner 32 may decrease the voltage of the scanning line WSL from Von to Voff depending on the control signal (at time T7). Then, the gate of the drive transistor Tr1 may be brought into a floating state, allowing a current Ids to flow between the drain and the source of the drive transistor Tr1, and thus the source voltage Vs may increase. However, since the voltage of the power line DSLa or DSLb is Vcc2, only a voltage lower than the threshold voltage Vel may be applied to the organic EL device 14. Accordingly, the organic EL device 14 may maintain extinction.

(Emission)

After completion of the signal writing and the mobility correction in each of the pixels 11, a power line 33 may increase the voltage of the power line DSLa or DSLb from Vcc2 to Vcc1 depending on the control signal (at time T8). Then, the current Ids may flow between the drain and the source of the drive transistor Tr1, allowing the source voltage Vs to increase. As a result, a voltage equal to or higher than the threshold voltage Vel may be applied to the organic EL device 14, allowing the organic EL device 14 to emit light at a desired luminance.

Figure 7:
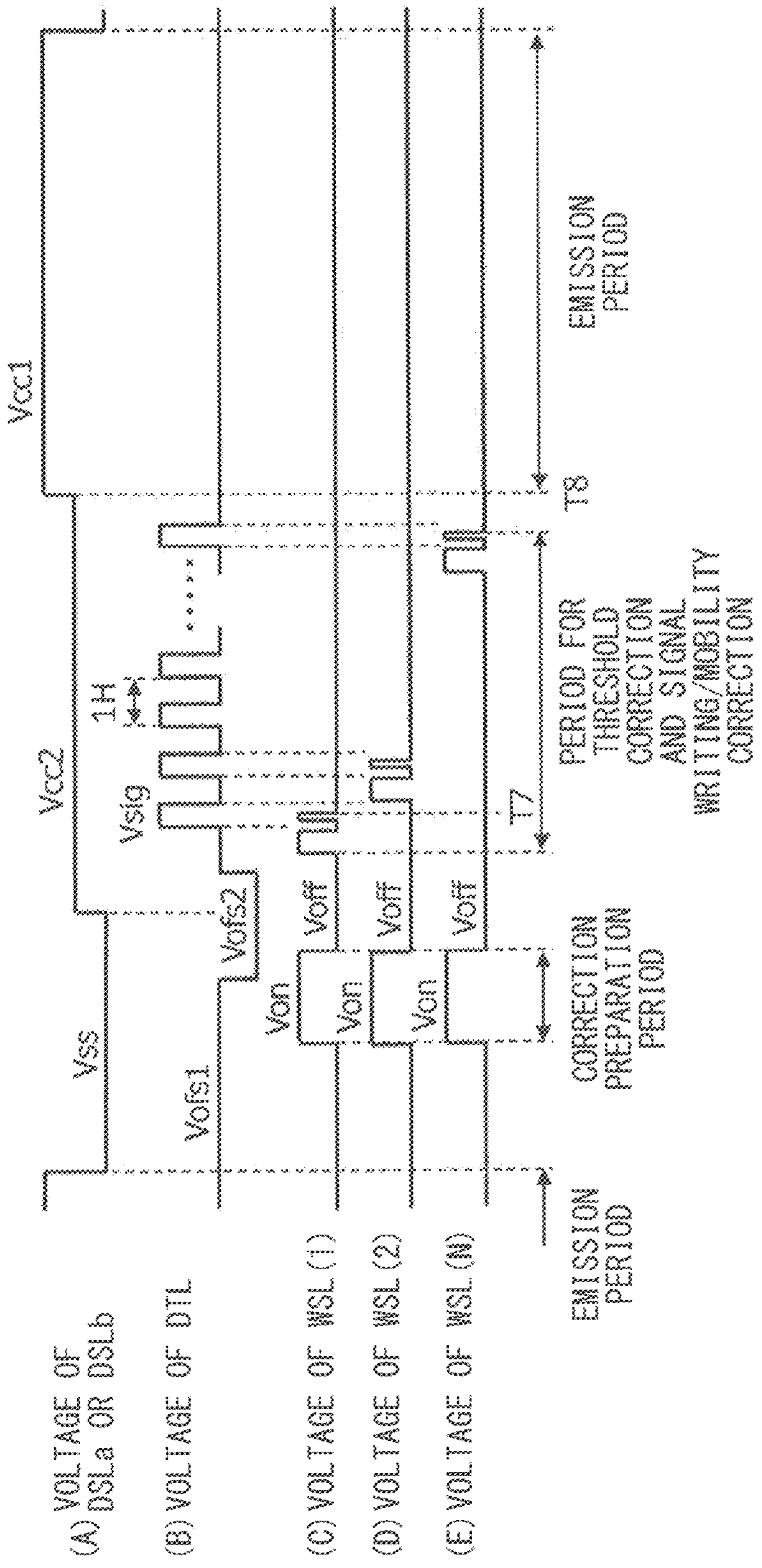
FIG. 7 is a diagram illustrating an example of signal waveforms between extinction and emission.

As illustrated in FIG. 7, for example, the controller 20 and the driver 30 may perform the threshold correction and the signal writing and mobility correction sequentially for each of the second pixel row to the final pixel row during a period from time T7 to time T8.

Figure 8:
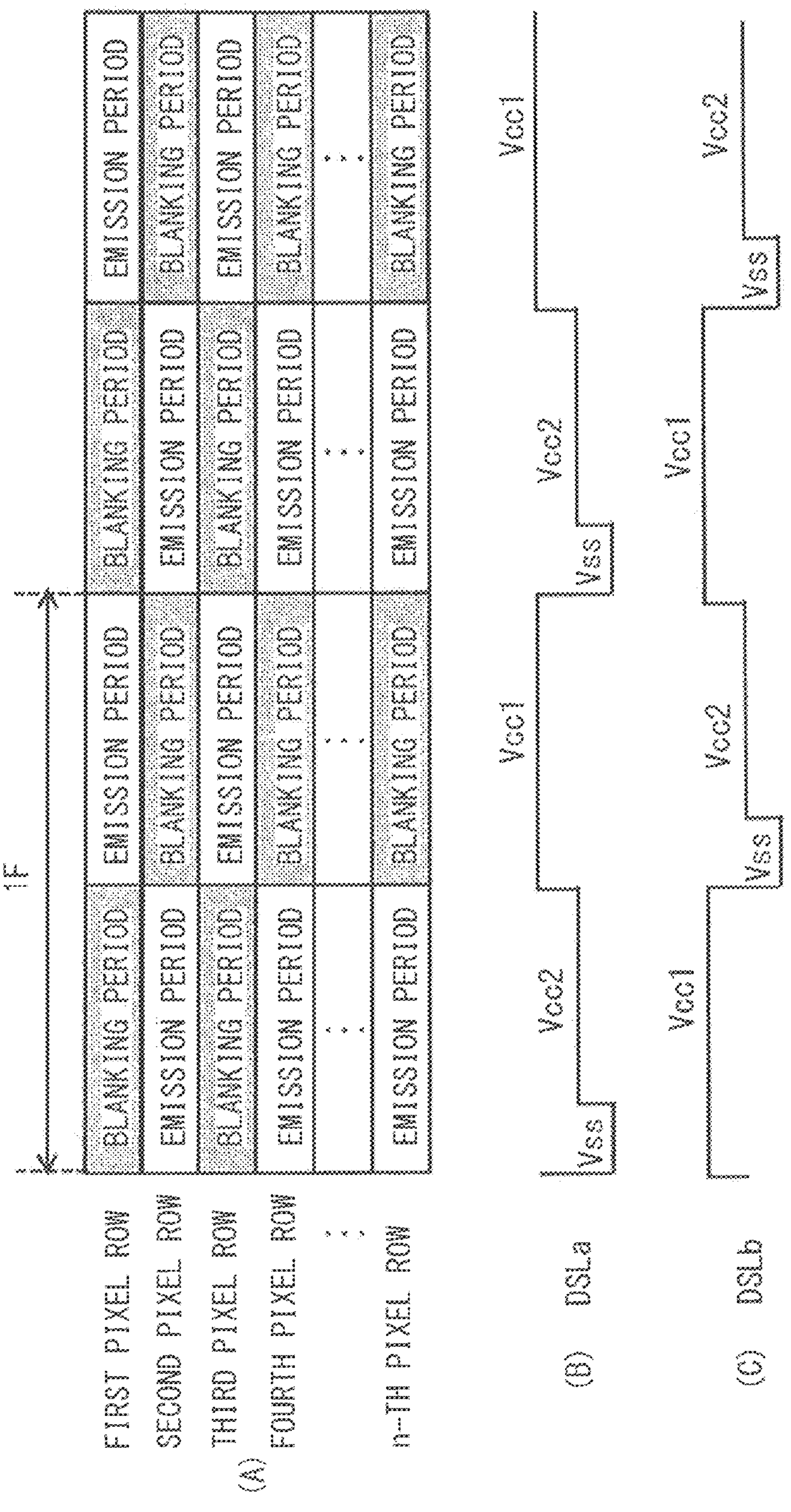
FIG. 8 is a diagram illustrating an example of emission control to be applied to a display panel.

Next, emission control to be applied to the display panel 10 is described. FIG. 8 illustrates an example of the emission control to be applied to the display panel 10. The controller 20 and the driver 30 may divide one-field (1F) period into a first half and a second half to perform emission operation alternately for odd-numbered pixel rows and even-numbered pixel rows. During the first half of the 1F period, the controller 20 and the driver 30 may cause each of the pixels 11 included in the even-numbered pixel rows to emit light, and may extinguish each of the pixels 11 included in the odd-numbered pixel rows. During the second half of the 1F period, the controller 20 and the driver 30 may extinguish each of the pixels 11 included in the even-numbered pixel rows, and may cause each of the pixels 11 included in the odd-numbered pixel rows to emit light.

The controller 20 and the driver 30 may perform operations such as preparation for threshold correction, threshold correction, and signal writing and mobility correction during a period (vertical blanking period) when extinguishing each of the pixels 11 included in the odd-numbered pixel rows. Further, the controller 20 and the driver 30 may perform operations such as preparation for threshold correction, threshold correction, and signal writing and mobility correction during a period (vertical blanking period) when extinguishing each of the pixels 11 included in the even-numbered pixel rows. During the first half of the 1F period (during the vertical blanking period), the controller 20 and the driver 30 may perform the preparation for threshold correction for each of the odd-numbered pixel rows together, and subsequently may perform a correction processing (such as threshold correction) and the signal writing and mobility correction for each of the odd-numbered pixel rows sequentially. During the second half of the 1F period (during the vertical blanking period), the controller 20 and the driver 30 may further perform the preparation for threshold correction for each of the even-numbered pixel rows together, and subsequently may perform a correction processing (such as threshold correction) and the signal writing and mobility correction for each of the even-numbered pixel rows sequentially.

For example, during the first half of the 1F period (during the vertical blanking period), the first power supply 23A may change the voltage of each power line DSLa to Vcc2, and the horizontal selector 31 may change the voltage of the signal line DTL to Vofs1. At this time, the write scanner 32 may apply a pulse of the voltage Von sequentially to each of the odd-numbered scanning lines WSL. This may allow the threshold correction to be performed sequentially for each of the odd-numbered pixel rows. During the second half of the 1F period (during the vertical blanking period), the second power supply 23B may change the voltage of each power line DSLb to Vcc2, and the horizontal selector 31 may change the voltage of the signal line DTL to Vofs1. At this time, the write scanner 32 may apply a pulse of the voltage Von sequentially to each of the even-numbered scanning lines WSL. This may allow the threshold correction to be performed sequentially for each of the even-numbered pixel rows.

For example, during the first half of the 1F period (during the vertical blanking period), the first power supply 23A may change the voltage of each power line DSLa to Vcc2, and the horizontal selector 31 may change the voltage of the signal line DTL to Vsig. At this time, the write scanner 32 may apply a pulse of the voltage Von sequentially to each of the odd-numbered scanning lines WSL. This may allow the signal to be sequentially written into each of the odd-numbered pixel rows, and may allow the mobility correction to be performed for each of the odd-numbered pixel rows together with the signal writing. During the second half of the 1F period (during the vertical blanking period), the second power supply 23B may change the voltage of each power line DSLb to Vcc2, and the horizontal selector 31 may change the voltage of the signal line DTL to Vsig. At this time, the write scanner 32 may apply a pulse of the voltage Von sequentially to each of the even-numbered scanning lines WSL. This may allow the signal to be sequentially written into each of the even-numbered pixel rows, and may allow the mobility correction to be performed for each of the even-numbered pixel rows together with the signal writing.

Figure 9:
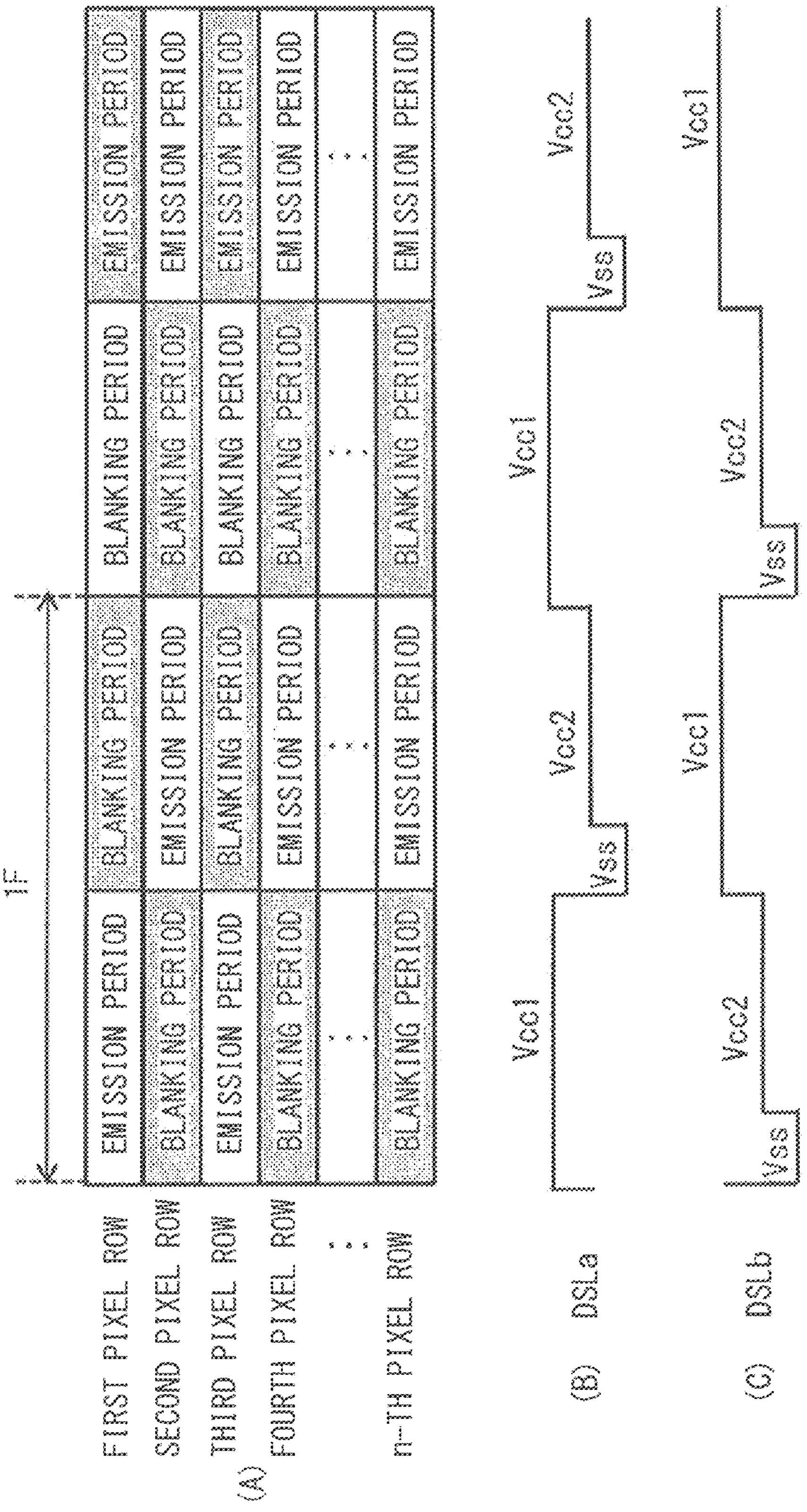
FIG. 9 is a diagram illustrating an example of emission control to be applied to a display panel.

It is to be noted that, the controller 20 and the driver 30 may perform the emission control illustrated in FIG. 8 in a manner so as to replace the emission period and the blanking period with each other, for example, as illustrated in FIG. 9.

[Effects]

Next, the effects of the display unit 1 are described in comparison with comparative examples.

Figure 10:
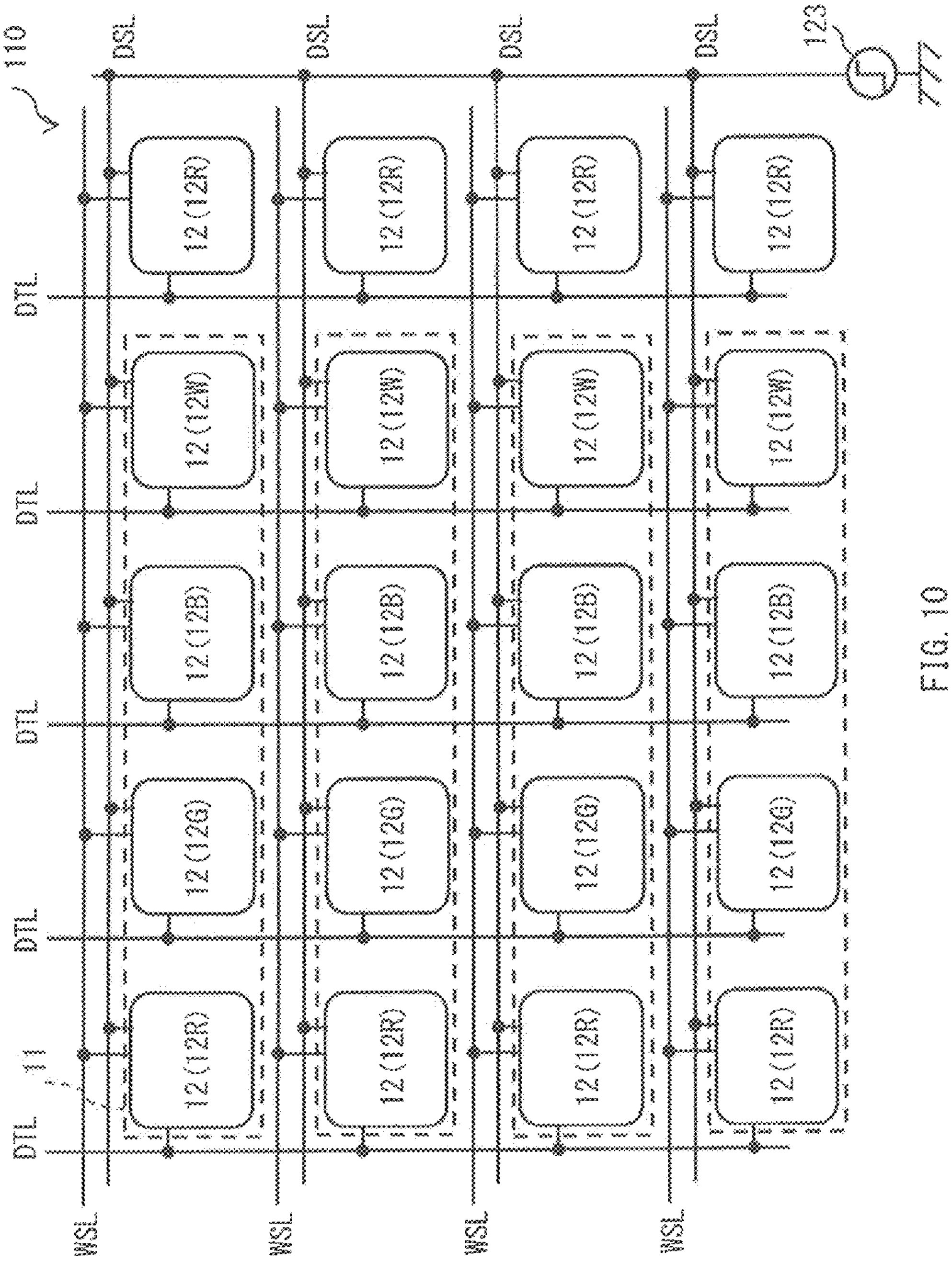
FIG. 10 is a diagram illustrating an example of a circuit configuration of a display panel according to a comparative example.
Figure 11:
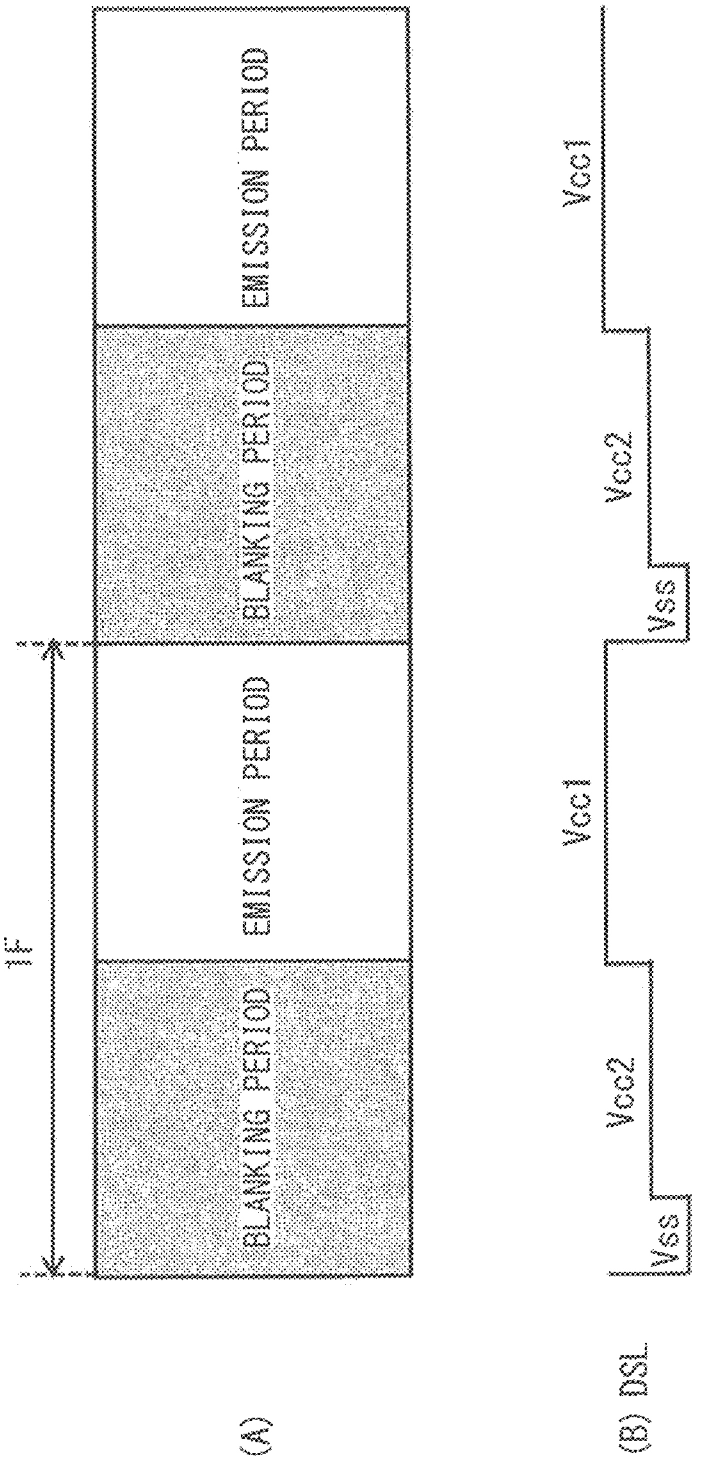
FIG. 11 is a diagram illustrating an example of emission control to be applied to a display panel according to a comparative example.

FIG. 10 illustrates an example of a circuit configuration of a display panel 110 according to a comparative example. FIG. 11 illustrates an example of emission control to be applied to the display panel 110. In the display panel 110, all power lines DSL are coupled to one power supply 123, and the voltages of all the power lines DSL are controlled by one power supply 123. Accordingly, the preparation for threshold correction is performed all at once using a common power line DSL potential during the vertical blanking period in the first half of the 1F period, and threshold correction as well as signal writing and mobility correction are performed sequentially. Thereafter, the common power line DSL potential is increased to an emission potential all at once to thereby allow all surfaces to emit light together, and then the emission control shifts to an emission period in the second half of the 1F period. Thus, the panel 110 enables operations such as the preparation for threshold correction, the threshold correction, the signal writing, and the mobility correction to be performed without using a scanner circuit that sequentially applies a voltage to the plurality of power lines DSL. This therefore allows the display panel 110 to have a narrow bezel by the size of the omitted scanner circuit. However, in this method, the emission period is only about half the length of the 1F period, causing flickering in emission to occur.

Figure 12:
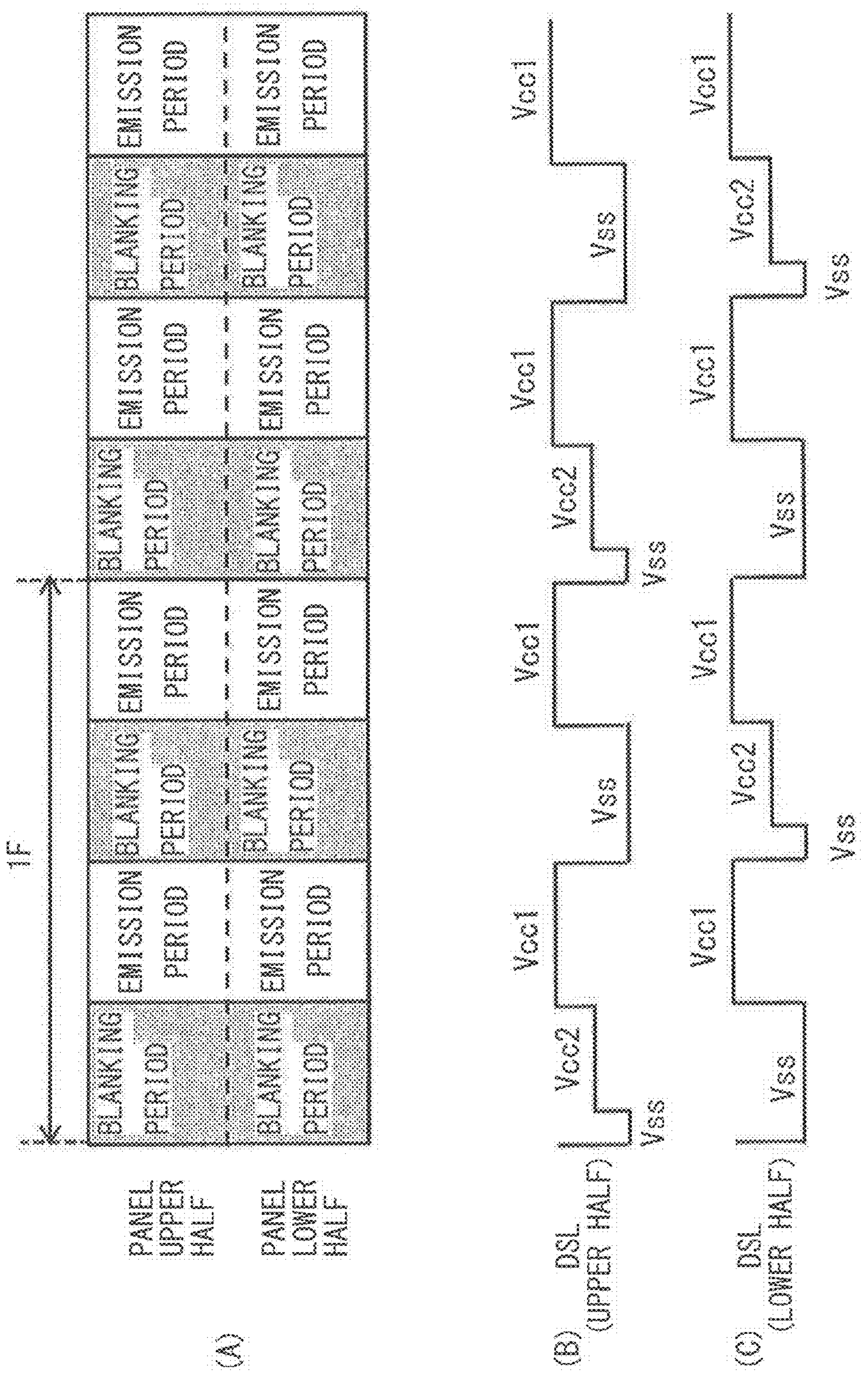
FIG. 12 is a diagram illustrating an example of emission control to be applied to a display panel according to a comparative example.

In light of the above, it may be considered, for example, to divide the display panel 110 into an upper half and a lower half; to divide the emission period into two sections in the 1F period; and to provide one power supply for each of the upper half and the lower half of the display panel 110, as illustrated in FIG. 12. The blanking period is also halved in the 1F period. During a first blanking period in the 1F period, the preparation for threshold correction, the threshold correction, the signal writing, and the mobility correction are performed, whereas, during a second blanking period in the 1F period, extinction is merely maintained until the next emission period is started. When the emission control is configured in this manner, it is possible to double an emission frequency without changing the scanning speed in the vertical direction. As a result, it becomes possible to reduce the flickering in emission. This method, however, undesirably generates a line at a location corresponding to the boundary between the upper half and the lower half of the display panel 110.

In contrast, in the display unit 1, the power lines DSLa assigned, respectively, to the odd-numbered pixel rows are electrically coupled to one another, and the power lines DSLb assigned, respectively, to the even-numbered pixel rows are electrically coupled to one another. Accordingly, it is unnecessary to provide a power scanner, because it is sufficient to provide one power supply 23A for each power line DSLa as well as one power supply 23B for each power line DSLb. Further, it is possible to perform emission control of each of the odd-numbered pixel rows and emission control of each of the even-numbered pixel rows independently of each other, thus also making it possible, for example, to divide the 1F period into two periods of a first half and a second half to perform emission operation for the odd pixel rows and the even pixel rows alternately. As a result, it becomes possible to achieve the display panel 10 with a narrow bezel in which flickering in emission is suppressed.

In the display unit 1, each power line DSLa and each power line DSLb may be disposed in the same layer as that of each signal line DTL, for example, as illustrated in FIG. 4, thus making it possible to produce the display panel 10 without adding a new process step. Therefore, it is possible to provide the display panel 10 with a narrow bezel in which flickering in emission is suppressed, at low cost.

The display unit 1 involves various features for the wiring layout of the display panel 10, in order to dispose each power line DSL in the same layer as that of each signal line DTL. First, each power line DSL may extend in the same direction as the extending direction of each signal line DTL. That is, each power line DSL and each signal line DTL may be side-by-side with each other. In addition, one power line DSLa may be assigned to each unit of two pixels 11 adjacent to each other in each of the odd-numbered pixel rows. Further, one power line DSLb may be assigned to each unit of two pixels 11 adjacent to each other in each of the even-numbered pixel rows. Furthermore, two pixels 11 assigned to each power line DSLa and two pixels 11 assigned to each power line DSLb may be disposed so as to be staggered by one pixel. No new process step needs to be added to the above-described features. Therefore, it is possible to provide the display panel 10 with a narrow bezel in which flickering in emission is suppressed, at low cost.

According to the display panel and the display unit of an embodiment of the technology, the first power lines assigned, respectively, to the odd-numbered pixel rows are electrically coupled to one another, and the second power lines assigned, respectively, to the even-numbered pixel rows are electrically coupled to one another. Accordingly, it is unnecessary to provide a power scanner, because it is sufficient to provide one power supply for each of the first power lines as well as one power supply for each of the second power lines. Further, it is possible to perform emission control of each of the odd-numbered pixel rows and emission control of each of the even-numbered pixel rows independently of each other, thus also making it possible, for example, to divide the 1F period into two periods of a first half and a second half to perform emission operation for the odd pixel rows and the even pixel rows alternately.

According to the display panel and the display unit of an embodiment of the technology, it is unnecessary to provide a power scanner. In addition, the display panel according to an embodiment of the technology is designed to have a circuit configuration in which the 1F period may be divided into two periods of a first half and a second half to enable emission operation to be performed on the odd pixel rows and the even pixel rows alternately. This therefore makes it possible to achieve a display panel with a narrow bezel in which flickering in emission is suppressed. It is to be noted that the effects according to an embodiment of the technology are not limited to those described above. The technology may have effects different from those described above, or may further have any other effects described herein in addition to those described above.

2. Modification Example

Hereinafter, a modification example of the display unit 1 is described. It is to be noted that the same numerals are assigned to components common to those of the display unit 1 of the foregoing example embodiment. Further, descriptions therefor are omitted where appropriate.

Modification Example A

Figure 13:
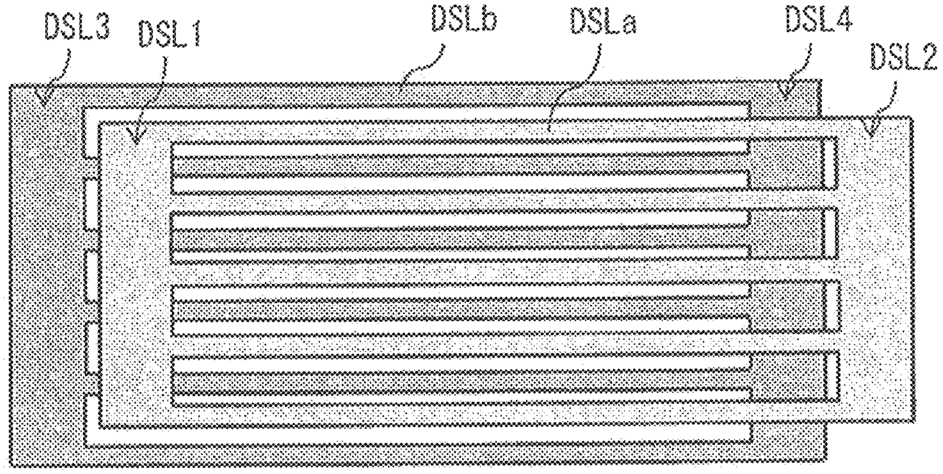
FIG. 13 is a diagram illustrating a modification example of a circuit configuration of a display panel.

In the foregoing example embodiment, each powerline DSLa and each power line DSLb may extend in the same direction as the extending direction of each signal line DTL. In the foregoing example embodiment, however, when each power line DSLa and each power line DSLb are disposed in a layer different from that of each signal line DTL, each power line DSLa and each power line DSLb may extend in a direction orthogonal to each signal line DTL (i.e., in the same direction as the extending direction of each scanning line WSL), for example, as illustrated in FIG. 13. In this case, however, wiring DSL1 and DSL2 that bind power lines DSLa as well as wiring DSL3 and DSL4 that bind power lines DSLb may be necessary at right and left regions of a bezel. One reason why it may be necessary to have not only wiring DSL1 but also DSL2 for each power line DSLa is because voltage drop due to an emission current needs to be suppressed when each power line DSLa extends in the longitudinal direction (right-left direction) of the panel. Further, one reason why it may be necessary to have not only wiring DSL3 but also DSL4 for each power line DSLb is because voltage drop due to an emission current needs to be suppressed when each power line DSLb extends in the longitudinal direction (right-left direction) of the panel. Although such provision of wiring DSL1, DSL2, DSL3, and DSL4 at the right and left regions of the bezel may cause the right and left regions of the bezel to be larger by the size of wiring DSL1, DSL2, DSL3, and DSL4, it may be possible to make the right and left regions of the bezel narrower than a case where a scanner circuit is provided.

Modification Example B

Figure 14:
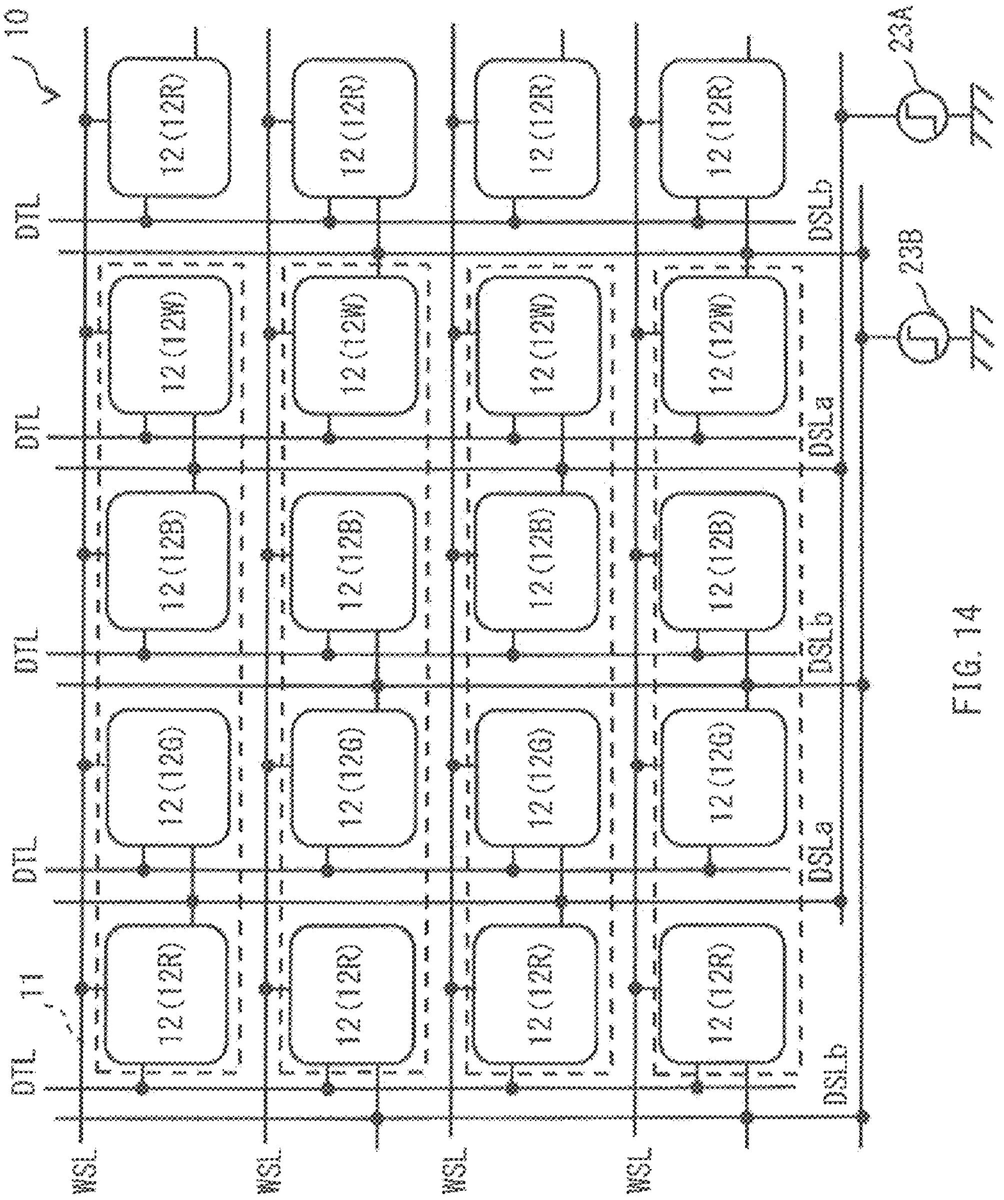
FIG. 14 is a diagram illustrating a modification example of a circuit configuration of a display panel.

In the foregoing example embodiment, four subpixels 12 included in each of the pixels 11 may be disposed in 2 by 2 matrix form. In the foregoing example embodiment and the modification example A, however, the four subpixels 12 included in each of the pixels 11 may be disposed in 1 by 4 matrix form, for example, as illustrated in FIG. 14.

In the modification example, each of the pixels 11 may be configured by a plurality of subpixels 12. The subpixel 12 corresponds to a specific but non-limiting example of the "subpixel" according to an embodiment of the technology. Further, one scanning line WSL may be assigned to each pixel row. In each pixel row, one signal line DTL may be assigned to each subpixel 12.

A plurality of predetermined power lines DSLa of the plurality of power lines DSL may be assigned to respective odd-numbered pixel rows (first pixel row, third pixel row, . . . from the top). A plurality of predetermined power lines DSLb of the plurality of power lines DSL may be assigned to respective even-numbered pixel rows (second pixel row, fourth pixel row, . . . from the top). The plurality of power lines DSLa may be even-numbered power lines DSL (second power line DSL, fourth power line DSL, . . . from the top), for example. Further, the plurality of power lines DSLb may be odd-numbered power lines DSL (first power line DSL, third power line DSL, . . . from the top), for example. It is to be noted that, alternatively, the plurality of power lines DSLa may be odd-numbered power lines DSL. In this case, the plurality of power lines DSLb may be even-numbered power lines DSL.

One power line DSLa may be assigned to each unit of two subpixels 12 adjacent to each other in each of the odd-numbered pixel rows. Further, one power line DSLb may be assigned to each unit of two subpixels 12 adjacent to each other in each of the even-numbered pixel rows. Two subpixels 12 assigned to each power line DSLa and two subpixels 12 assigned to each power line DSLb may be disposed so as to be staggered by one subpixel 12. Each power line DSLa may be disposed between the two subpixels 12 assigned to the each power line DSLa. Each power line DSLb may be disposed between the two subpixels 12 assigned to the each power line DSLb.

Each signal line DTL may be coupled to an output terminal of the horizontal selector 31. Each scanning line WSL may be coupled to the output terminal of the write scanner 32. Each power line DSLa may be coupled to the output terminal of the first power supply 23A. Each power line DSLb may be coupled to the output terminal of the second power supply 23B.

According to the present modification example, it is possible to provide the display panel 10 with a narrow bezel in which flickering in emission is suppressed, at low cost, similarly to the foregoing example embodiment.

The present modification example also involves various features for the wiring layout of the display panel 10, in order to dispose each power line DSL in the same layer as that of each scanning line WSL. First, each power line DSL may extend in the same direction as the extending direction of each signal line. In addition, one power line DSLa may be assigned to each unit of two subpixels 12 adjacent to each other in each of the odd-numbered pixel rows. Further, one power line DSLb may be assigned to each unit of two subpixels 12 adjacent to each other in each of the even-numbered pixel rows. Furthermore, two subpixels 12 assigned to each power line DSLa and two subpixels 12 assigned to each power line DSLb may be disposed so as to be staggered by one pixel. No new process step needs to be added to the above-described features. Therefore, it is possible to provide the display panel 10 with a narrow bezel in which flickering in emission is suppressed, at low cost, also in the present modification example.

Modification Example C

Figure 15:
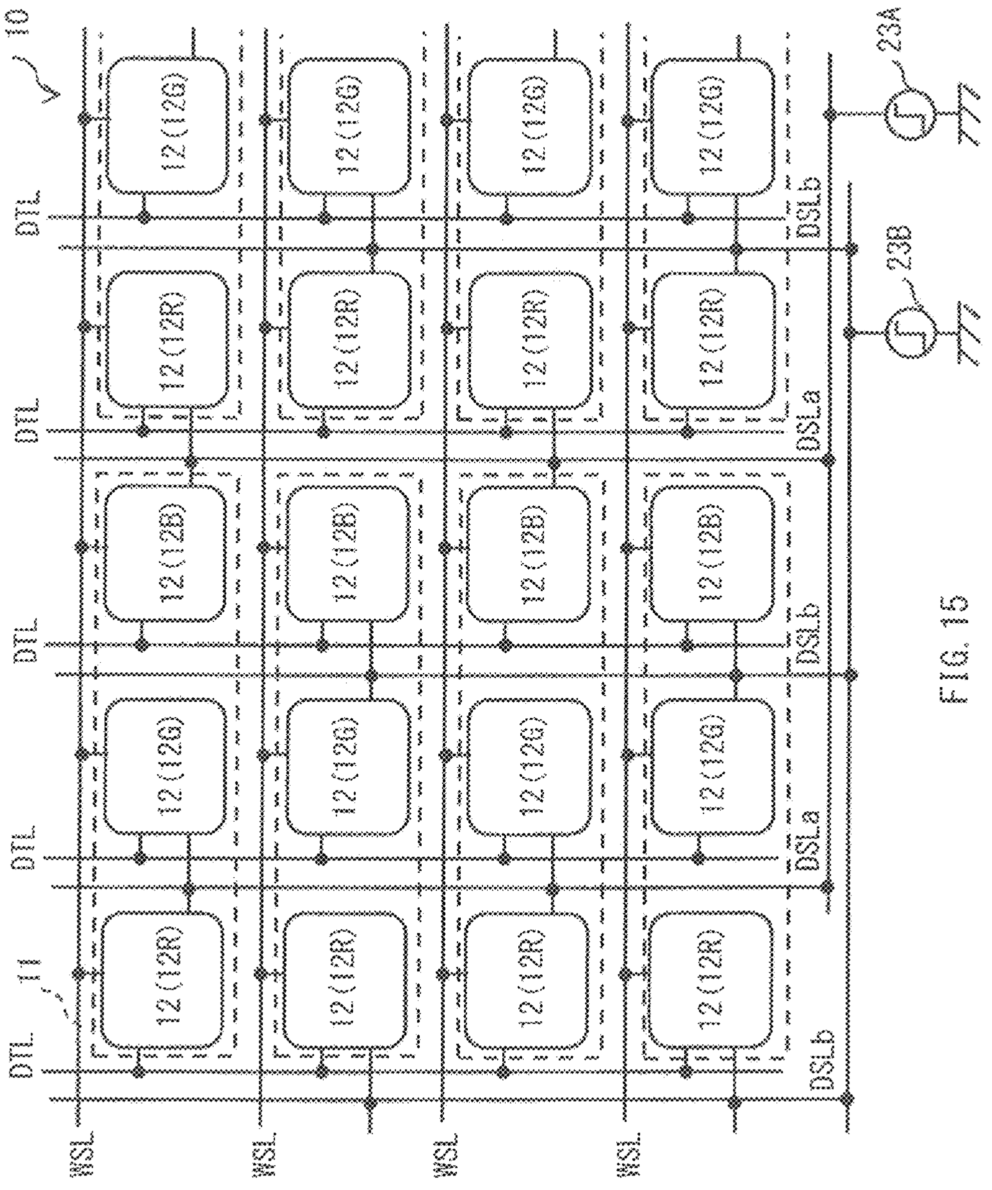
FIG. 15 is a diagram illustrating a modification example of a circuit configuration of a display panel.

In the foregoing example embodiment, each of the pixels 11 may include four subpixels 12. In the foregoing example embodiment and the modification example A, however, each of the pixels 11 may include three subpixels 12, for example, as illustrated in FIG. 15. Three subpixels 12 may be disposed in 1 by 3 matrix form. The three subpixels 12 included in each of the pixels 11 may be configured by subpixels 11R, 11G, and 11B, for example. In the present modification example, the modes of coupling of each subpixel 12 to a plurality of scanning lines WSL, a plurality of signal lines DTL, and a plurality of power lines DSL are similar to the coupling modes described in the foregoing modification example A.

According to the present modification example, it is possible to provide the display panel 10 with a narrow bezel in which flickering in emission is suppressed, at low cost, similarly to the foregoing example embodiment.

3. Application Example

Hereinafter, an application example of the display unit 1 described in the foregoing example embodiment and modification examples (hereinafter, referred to as "the foregoing example embodiment, etc.") are described. It is possible to apply the display unit 1 of the foregoing example embodiment to a display unit of an electronic apparatus in various fields, which may display an image signal supplied from the outside or an image signal generated inside, as a still image or as an image. Non-limiting examples of the electronic apparatus with such display unit may include a television, a digital camera, a laptop personal computer, a portable terminal unit such as a mobile phone, and a video camera.

Figure 16:
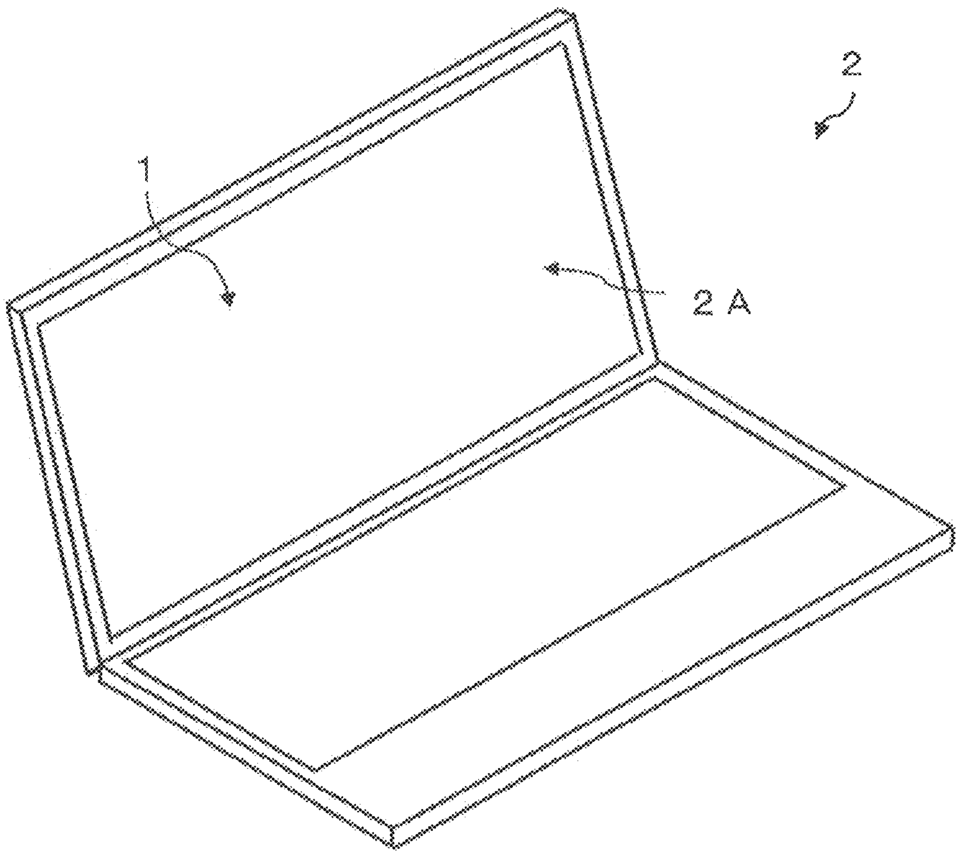
FIG. 16 is a perspective view of an outer appearance of an application example of the display unit of the example embodiment.

FIG. 16 illustrates a schematic configuration example of an electronic apparatus 2 according to the present application example. The electronic apparatus 2 may be a laptop foldable personal computer including a display surface 2A on a main surface of one of two plate-shaped casings, for example. The electronic apparatus 2 may include the display unit 1 according to any of the foregoing example embodiment, modification examples, and the application example, as well as the display panel 10 at a location of the display surface 2A, for example. Since the display unit 1 is provided in the present application example, a frame provided around the display surface 2A may have a narrow bezel.

Although the technology has been described hereinabove by way of example with reference to the example embodiments, the modification examples, and the application examples, the technology is not limited thereto but may be modified in a wide variety of ways. Moreover, the effects described hereinabove are mere examples. The effects according to an embodiment of the technology are not limited to those described hereinabove. The technology may further include other effects in addition to the effects described hereinabove.

It is possible to achieve at least the following configurations from the foregoing example embodiments and the modification examples of the technology.

(1) A display panel, including:
- a plurality of pixels disposed in matrix; and
- a plurality of signal lines and a plurality of power lines both extending in a column direction, the plurality of power lines including
  - a plurality of first power lines assigned to respective odd-numbered pixel rows of the pixels and electrically coupled to one another, and
  - a plurality of second power lines assigned to respective even-numbered pixel rows of the pixels and electrically coupled to one another.

(2) The display panel according to (1), wherein
- one of the first power lines is assigned to each unit of two of the pixels adjacent to each other in each of the odd-numbered pixel rows, and
- one of the second power lines is assigned to each unit of two of the pixels adjacent to each other in each of the even-numbered pixel rows.

(3) The display panel according to (2), wherein the two of the pixels assigned to each of the first power lines and the two of the pixels assigned to each of the second power lines are disposed to be staggered by one pixel.

(4) The display panel according to (1), wherein
- each of the pixels include a plurality of subpixels,
- one of the first power lines is assigned to each unit of two of the subpixels adjacent to each other in each of the odd-numbered pixel rows, and
- one of the second power lines is assigned to each unit of two of the subpixels adjacent to each other in each of the even-numbered pixel rows.

(5) The display panel according to (4), wherein the two of the subpixels assigned to each of the first power lines and the two of the subpixels assigned to each of the second power lines are disposed to be staggered by one subpixel.

(6) The display panel according to any one of (1) to (5), wherein each of the power lines and each of the signal lines are disposed in a same layer.

(7) A display unit with a display panel, and a drive circuit that drives the display panel, the display panel including:
- a plurality of pixels disposed in matrix; and a plurality of signal lines and a plurality of power lines both extending in a column direction, the plurality of power lines including a plurality of first power lines assigned to respective odd-numbered pixel rows of the pixels and electrically coupled to one another, and a plurality of second power lines assigned to respective even-numbered pixel rows of the pixels and electrically coupled to one another.

(8) The display unit according to (7), wherein the drive circuit divides one frame period into two periods of a first half and a second half and causes the odd-numbered pixel rows and the even-numbered pixel rows to perform emission operation alternately.

(9) The display unit according to (8), wherein the drive circuit causes each of the pixels included in the even-numbered pixel rows to emit light and extinguishes each of the pixels included in the odd-numbered pixel rows during the first half of the 1F period, and the drive circuit extinguishes each of the pixels included in the even-numbered pixel rows and causes each of the pixels included in the odd-numbered pixel rows to emit light during the second half of the one frame period.

(10) The display unit according to (9), wherein the drive circuit performs a correction processing for each of the pixels included in the even-numbered pixel rows together with the extinction during the period in which the driver circuit extinguishes each of the pixels included in the even-numbered pixel rows, and the drive circuit performs the correction processing for each of the pixels included in the odd-numbered pixel rows together with the extinction during the period in which the driver circuit extinguishes each of the pixels included in the odd-numbered pixel rows.

Although the technology has been described in terms of exemplary embodiments, it is not limited thereto. It should be appreciated that variations may be made in the described embodiments by persons skilled in the art without departing from the scope of the technology as defined by the following claims. The limitations in the claims are to be interpreted broadly based on the language employed in the claims and not limited to examples described in this specification or during the prosecution of the application, and the examples are to be construed as non-exclusive. For example, in this disclosure, the term “preferably”, “preferred” or the like is non-exclusive and means “preferably”, but not limited to. The use of the terms first, second, etc. do not denote any order or importance, but rather the terms first, second, etc. are used to distinguish one element from another. The term “substantially” and its variations are defined as being largely but not necessarily wholly what is specified as understood by one of ordinary skill in the art. The term “about” or “approximately” as used herein can allow for a degree of variability in a value or range. Moreover, no element or component in this disclosure is intended to be dedicated to the public regardless of whether the element or component is explicitly recited in the following claims.

What is claimed is:

1. A display panel, comprising:

a plurality of pixels disposed in a matrix, each of the plurality of pixels including an organic electroluminescence device and a drive transistor; and a plurality of signal lines and a plurality of power lines both extending in a column direction, the plurality of power lines including a plurality of first power lines assigned to respective odd-numbered pixel rows of the pixels and electrically coupled to one another, the plurality of first power lines being connected to the respective drive transistors in each pixel of the odd-numbered pixel rows, and a plurality of second power lines assigned to respective even-numbered pixel rows of the pixels and electrically coupled to one another, the plurality of second power lines being connected to the respective drive transistors in each pixel of the even-numbered pixel rows, wherein the display panel is configured to be driven by a drive circuit, wherein the drive circuit divides one frame period into two periods of a first half and a second half and causes the odd-numbered pixel rows and the even-numbered pixel rows to perform emission operation alternately, wherein the drive circuit causes each of the pixels included in the even-numbered pixel rows to emit light and extinguishes each of the pixels included in the odd-numbered pixel rows during the first half of the 1F period, wherein the drive circuit extinguishes each of the pixels included in the even-numbered pixel rows and causes each of the pixels included in the odd-numbered pixel rows to emit light during the second half of the one frame period, wherein the drive circuit performs a correction processing for each of the pixels included in the even-numbered pixel rows together with the extinction during the period in which the driver circuit extinguishes each of the pixels included in the even-numbered pixel rows, and wherein the drive circuit performs the correction processing for each of the pixels included in the odd-numbered pixel rows together with the extinction during the period in which the driver circuit extinguishes each of the pixels included in the odd-numbered pixel rows.

2. The display panel according to claim 1, wherein one of the first power lines is assigned to each unit of two of the pixels adjacent to each other in each of the odd-numbered pixel rows, and one of the second power lines is assigned to each unit of two of the pixels adjacent to each other in each of the even-numbered pixel rows.

3. The display panel according to claim 2, wherein the two of the pixels assigned to each of the first power lines and the two of the pixels assigned to each of the second power lines are disposed to be staggered by one pixel.

4. The display panel according to claim 1, wherein each of the pixels include a plurality of subpixels, one of the first power lines is assigned to each unit of two of the subpixels adjacent to each other in each of the odd-numbered pixel rows, and one of the second power lines is assigned to each unit of two of the subpixels adjacent to each other in each of the even-numbered pixel rows.

5. The display panel according to claim 4, wherein the two of the subpixels assigned to each of the first power lines and the two of the subpixels assigned to each of the second power lines are disposed to be staggered by one subpixel.

6. The display panel according to claim 1, wherein each of the power lines and each of the signal lines are disposed in a same layer.

7. A display unit with a display panel and a drive circuit that drives the display panel, the display panel comprising:

a plurality of pixels disposed in a matrix, each of the plurality of pixels including an organic electroluminescence device and a drive transistor; and a plurality of signal lines and a plurality of power lines both extending in a column direction, the plurality of power lines including a plurality of first power lines assigned to respective odd-numbered pixel rows of the pixels and electrically coupled to one another, the plurality of first power lines being connected to the respective drive transistors in each pixel of the odd-numbered pixel rows, and a plurality of second power lines assigned to respective even-numbered pixel rows of the pixels and electrically coupled to one another, the plurality of second power lines being connected to the respective drive transistors in each pixel of the even-numbered pixel rows, wherein the drive circuit divides one frame period into two periods of a first half and a second half and causes the odd-numbered pixel rows and the even-numbered pixel rows to perform emission operation alternately, wherein the drive circuit causes each of the pixels included in the even-numbered pixel rows to emit light and extinguishes each of the pixels included in the odd-numbered pixel rows during the first half of the 1F period, wherein the drive circuit performs a correction processing for each of the pixels included in the even-numbered pixel rows together with the extinction during the period in which the driver circuit extinguishes each of the pixels included in the even-numbered pixel rows, and wherein the drive circuit performs the correction processing for each of the pixels included in the odd-numbered pixel rows together with the extinction during the period in which the driver circuit extinguishes each of the pixels included in the odd-numbered pixel rows.

8. The display unit according to claim 7, wherein one of the first power lines is assigned to each unit of two of the pixels adjacent to each other in each of the odd-numbered pixel rows, and one of the second power lines is assigned to each unit of two of the pixels adjacent to each other in each of the even-numbered pixel rows.

9. The display unit according to claim 8, wherein the two of the pixels assigned to each of the first power lines and the two of the pixels assigned to each of the second power lines are disposed to be staggered by one pixel.

10. The display unit according to claim 7, wherein each of the pixels include a plurality of subpixels, one of the first power lines is assigned to each unit of two of the subpixels adjacent to each other in each of the odd-numbered pixel rows, and one of the second power lines is assigned to each unit of two of the subpixels adjacent to each other in each of the even-numbered pixel rows.

11. The display unit according to claim 10, wherein the two of the subpixels assigned to each of the first power lines and the two of the subpixels assigned to each of the second power lines are disposed to be staggered by one subpixel.

12. The display unit according to claim 7, wherein each of the power lines and each of the signal lines are disposed in the same layer.

* * * * *